Nov. 27, 1951  R. L. BIGSBY  2,576,385
EXTENSIBLE STORAGE COMPARTMENT FOR AUTOMOBILES
Filed Oct. 1, 1949  2 SHEETS—SHEET 1

Inventor:
Robert L. Bigsby
By Bair + Freeman
Attys.

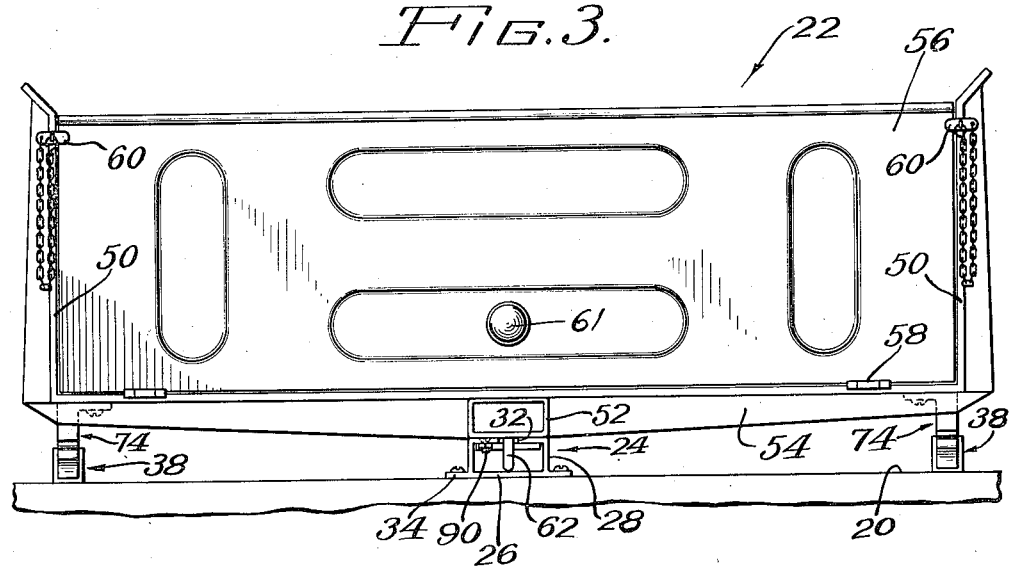
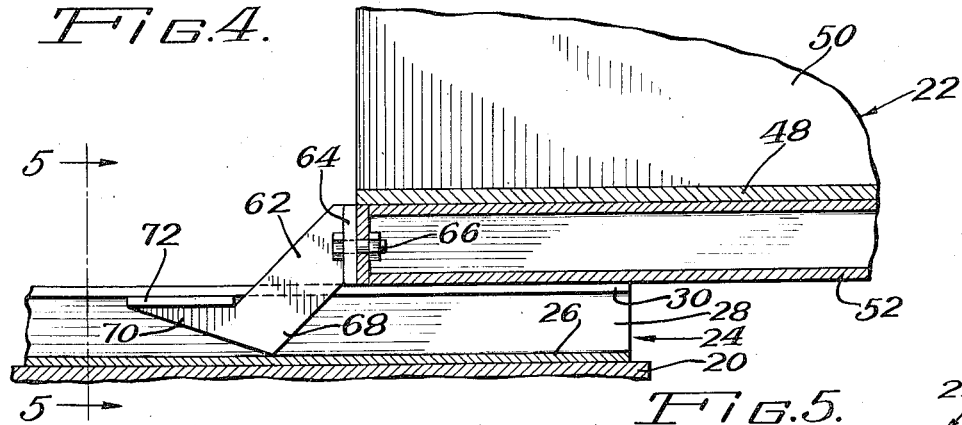
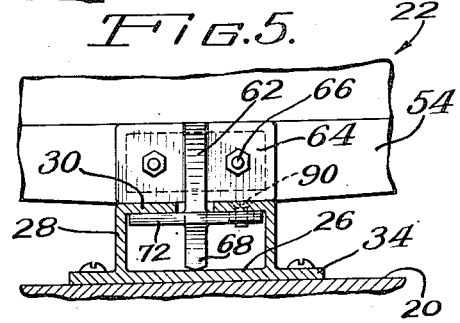
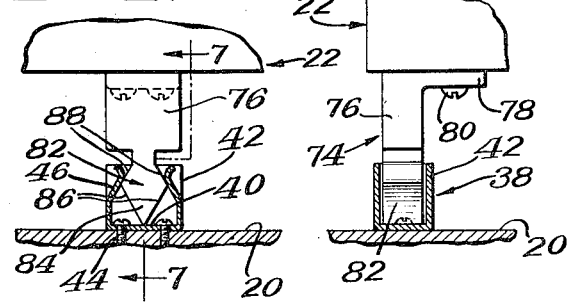

Patented Nov. 27, 1951

2,576,385

UNITED STATES PATENT OFFICE 2,576,385

EXTENSIBLE STORAGE COMPARTMENT FOR AUTOMOBILES

Robert L. Bigsby, Lancaster, Mo.

Application October 1, 1949, Serial No. 119,166

8 Claims. (Cl. 224—42.44)

This invention relates to a carrying device for carrying light loads in a passenger automobile.

It is well known that the owner of a passenger automobile dislikes placing loads of supplies and the like in the passenger compartment of his automobile. Particularly, if the automobile is new such activity impairs the appearance of the automobile. The owner determines at first not to carry any such loads in the passenger compartment but sooner or later the necessity to do so arises and little by little the appearance of the automobile is impaired.

As examples of the loads that the owner of an automobile is required to carry at times the following are common: groceries, supplies, tools, repair parts, light pieces of lumber, etc. Often, too, anyone of the general public will carry camping equipment, golf supplies, a farmer will carry groceries, supplies and produce, traveling men carry drop shipments and supplies, servicemen haul tools and supplies, a hatchery operator performs flock work, service work requiring hauling and making deliveries.

Pull-type trailers, top racks and carriers, and bumper racks and carriers have been found to be impractical, costly, and otherwise ineffective.

An object of the present invention is the provision of a novel construction carrying device for inclusion in the baggage compartment of an automobile for carrying light loads so that those loads need not be placed in the passenger compartment.

Another object is the provision of a trunk box which is insertable into the baggage compartment of an automobile and can be extended out the baggage compartment to effectively enlarge the compartment.

Another object is the provision of a novel construction trunk box of the character referred to which can be extended to various extents out of the baggage compartment for carrying greater or lesser loads.

Still another object is the provision of a novel construction trunk box of the character referred to together with its accessories that can be included in the baggage compartment of a standard automobile.

A further object is the provision of a novel construction device for carrying light loads which includes a trunk box which can be slid into and out of the baggage compartment with a maximum of facility.

A still further object is the provision of a novel load carrying trunk box of the character referred to for mounting in the baggage compartment of an automobile which can be extended for enlarging the effective capacity of the compartment and which can be totally inserted into the baggage compartment so that the door of the compartment can be closed when no load is being carried or when a load no larger than the trunk box itself is being carried.

A still further object is the provision of a load carrying trunk box for insertion in the baggage compartment of an automobile which can be withdrawn to different extents out the open end of the baggage compartment and effectively locked in various positions of extension; the locking feature prevents horizontal movement of the trunk box and the load being carried prevents upward movement of the trunk box so that the trunk box is thereby effectively locked in place.

Another object of the invention is the provision of a trunk box of the character above referred to which can be, when desired, totally withdrawn from the baggage compartment but which includes removable stop means for normally preventing removal of the trunk box.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 3 is an enlarged rear view of the trunk box and the floor of the baggage compartment;

Figure 4 is an enlarged scale detail view of the front lower corner of the trunk box and the means for securing or guiding the trunk box;

Figure 5 is a view taken on line 5—5 of Figure 4;

Figure 6 is a side view of the locking and latch means for locking the trunk box in one of its adjusted positions; and Figure 7 is a view taken on line 7—7 of Figure 6.

Figure 1:
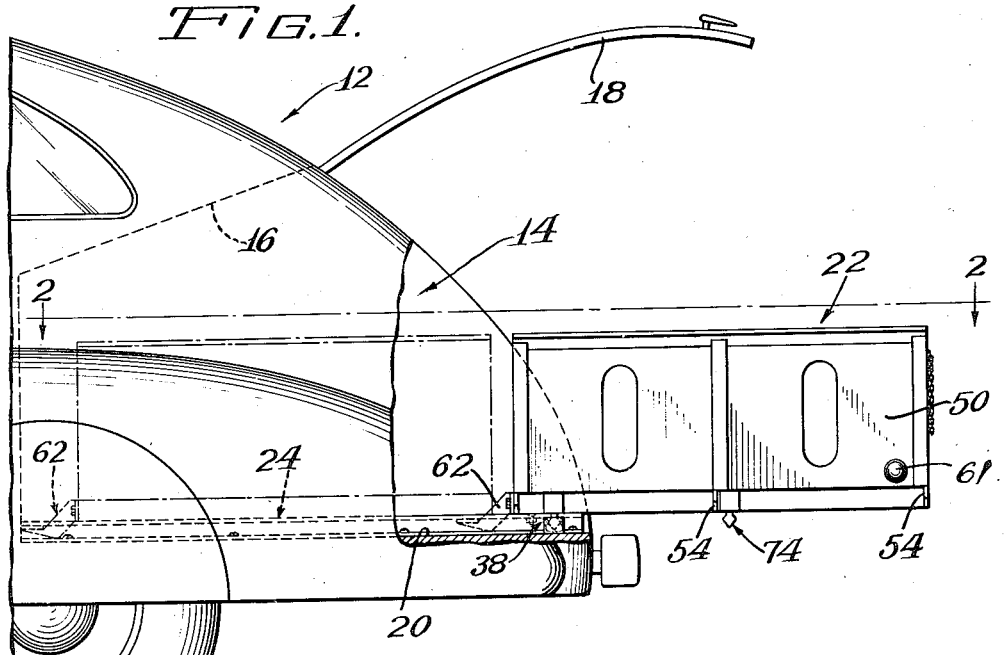
Figure 1 is a side view of the rear portion of an automobile showing the trunk box fully extended out of the baggage compartment.

Referring now in detail to the drawings and particularly to Figure 1, the numeral 12 indicates an automobile of any of the various kinds now on the market which is usually provided with a rear baggage compartment. The baggage compartment in this particular instance is identified by the numeral 14 which is defined at the top and forward end by the dotted line 16 and has a rear open end closed by a door 18. The baggage compartment also has a floor 20 and is entirely closed when the door 18 is lowered and of course locking means of any type may be provided for locking the door in closed position.

The numeral 22 indicates generally the trunk box which is placed in the baggage compartment and which will be described in detail later. The accessories mounted in the baggage compartment will be described first and include a guide means 24 which may also be referred to as a channel member because of its physical construction. As viewed in Figures 3 and 5, the guide means or channel member 24 is rectangular in cross-section having a bottom portion 26, side walls 28 and turned over flanges 30 at the top which extend toward each other and define a longitudinal slot or opening 32 which extends the full length of the channel member. The bottom portion of the channel member is provided with side flanges 34. Preferably the guide means or channel member 24 is centrally located laterally of the baggage compartment and extends longitudinally the full length, that is, from the forward end to the rear open end of the compartment. The side flanges 34 are provided with appropriate holes for insertion of screws 36 which are screwed into the floor of the baggage compartment thus securing the guide means rigidly in position.

The forward end of the guide member 24 may be open or closed as desired and the rear end is open for the insertion and removal of an element on the trunk box 22.

Latch means or positioning means 38 are provided for normally locking the trunk box in adjusted position. Two such latch means are provided, being positioned adjacent the rear open end of the baggage compartment and spaced laterally so as to be disposed respectively under the lateral edges of the trunk box. Each latch means includes a bottom portion 40 (Figures 6 and 7) and side plates 42. The side plates are preferably disposed in laterally spaced relation and screws 44 are inserted through holes in the bottom portion 40 and screwed into the floor of the baggage compartment. Disposed transverse to the side plates 42 are spring fingers 46 which may, if desired, be integral with the bottom portion 40 and are spaced apart in a direction transverse to the side plates 42. The fingers 46 at their upper ends are bent inwardly toward each other and at their extreme upper tips bent outward slightly. The spring fingers 46 are adapted to be sprung apart and they normally return to a position more closely spaced together.

Figure 2:
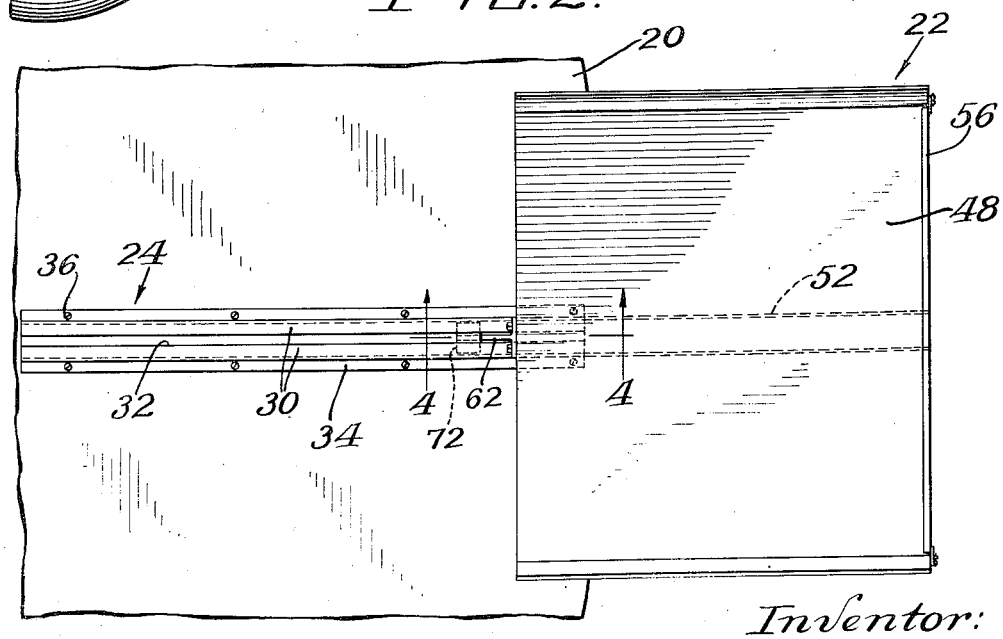
Figure 2 is a view taken on line 2—2 of Figure 1 but with the side portions of the automobile omitted.

The trunk box 22 includes a floor element 48 and side walls 50. Preferably a reinforcing member 52 of any desired shape, such as the shape illustrated in Figure 3, is disposed centrally of the floor member 48 on the under side thereof, in longitudinally extending relation to the trunk box. Transverse reinforcing ribs 54 are provided under the floor element of the trunk box in longitudinally spaced relation. Other details of construction of the trunk box need not be elaborated on in detail but it is pointed out that the box is preferably of steel construction and reinforced at the desired points for imparting the desired strength and rigidity thereto. The front end of the box, which for the sake of reference is the left end in Figures 1 and 2, is open. At the rear end of the trunk box is an end gate 56 hinged at 58 and vertically swingable to open and closed positions. Latch means such as 60 may be provided for latching the end gate in closed position. Reflector elements 61 are secured at appropriate locations on the trunk box to serve as nighttime warning indications.

Secured to the front end of the trunk box is a tongue 62 in the form of a relatively thin member disposed with its narrow edges directed vertically. The upper end of the tongue 62 is secured to the reinforcing member 52 of the trunk box by any desired means such as by welding or by the use of bolts. In the present instance the tongue is provided with flanges 64 which abut against the closed front end of the member 52 and bolts 66 are inserted through holes in the flanges and the end element of the member 52 for securing the tongue in place. The tongue 62 extends at an angle forwardly and downwardly from the trunk box and extends through the longitudinal opening or slot 32 into the interior of the channel member 24. The lower portion 68 of the tongue is adapted on occasion to bear on the bottom of the channel member. The tongue 62 also has a forwardly extending portion 70 on which is mounted a plate or similar element 72 extending transversely of the tongue and of a length substantially equal to the width of the interior of the channel member (Figures 2, 3 and 5). The element 72 engages the under side of the top turned over flanges 30.

The trunk box is disposed so that the bottom end of the trunk box is immediately above the top surface of the channel member 24. The tongue 62 tends to support the forward end of the trunk box in that position and the rear of the trunk box is supported by downwardly extending feet or supporting projections 74 which because of their function may also be referred to as locking projections. The locking projections 74 are arranged in pairs, one pair being adjacent the front end of the trunk box, and another pair spaced rearwardly therefrom. The projections of each pair are arranged one on each side, in line with the respective latch means 38. Each projection 74 includes a leg element 76 (Figures 6 and 7) and a top flange 78 which may be bolted or otherwise secured to the trunk box by means of bolts 80. On the lower end of the leg element 76 is the locking projection proper 82 which includes a diamond shape element 84 having wedging surfaces which for convenience are referred to by specific reference numerals as follows: the surfaces 86 at the lower portion of the diamond converge downwardly and the surfaces 88 diverge downwardly.

Mounted in the outer end of the channel member 24, that is, the end thereof adjacent the open end of the baggage compartment is a bolt and nut means 90. This bolt and nut means is inserted in a hole in one of the flanges 30 adjacent the outer end of the channel member. The nut is of considerable size and is disposed next adjacent the under surface of the flange. The nut and bolt means may be removed at will as is obvious. The nut and bolt means 90 is for the purpose of acting as a stop for normally preventing withdrawal of the trunk box from the baggage compartment by means of the fact that the element 72 normally engages the nut.

In use of the device and mounting the trunk box in the baggage compartment the tongue 62 is inserted in the channel member 24 through the open outer end of the channel member. If desired, the nut and bolt means 90 may be removed for facilitating insertion of the tongue but the tongue can be inserted even without removing the bolt and nut means; by tipping the rear end of the trunk box upwardly, the forward end of the tongue 62 is lowered and the element 72 is inserted below or under the bolt and nut means. Then the trunk box can be moved forwardly to the dot-dash line position illustrated in Figure 1. The forward end of the tongue 62 is run up to the forward end of the channel member 24 and the rear end of the trunk box is entirely within the confines of the baggage compartment. In that case the door 18 can be closed. In inserting the trunk box it is necessary of course to lift the rear end of the trunk box upwardly so that the locking projections 74 clear the latch means 38 which are in line with the locking projections. It is obvious that the trunk box is disposed above the channel member 24 and the locking projections 74 are of such length that they ride on the floor of the compartment, and being spaced at the lateral edges of the trunk box stabilize the trunk box against sidewise wobbling movement. For extending the trunk box out of the baggage compartment it is merely withdrawn rearwardly to the desired extent. The locking projections 74 are spaced longitudinally of the trunk box beginning with the forward end of the trunk box. In other words one pair of locking projections are disposed closely adjacent the front end of the trunk box and another pair are disposed in position spaced rearwardly therefrom or in the present case at substantially midway longitudinally thereof. The spacing may of course be as desired.

The locking projections 74 are insertable vertically into the latch means 38, and to insert them the trunk box is lifted at its rear end and the locking projections selected are positioned over the latch means 38 and then the rear end of the trunk box lowered. The lower edges 86 of the element 82 spread the spring fingers 46 and when the locking projections are inserted the spring fingers again return toward their normal position and engage the upper surfaces 88 normally locking the trunk box in position. The latch means 38 thus restrains the trunk box against movement horizontally, that is, laterally and longitudinally. If it is desired to withdraw the trunk box the full extent to the position shown in Figure 1, the forward locking projections are inserted in the latch means and of course if it is desired to withdraw the trunk box a lesser amount, the rear projections 74 are inserted in the latch means, and it will be seen that the extent to which the trunk box is withdrawn can be adjusted to any position by placing the locking projections at the positions desired.

As stated above, the latch means 38 prevent horizontal movement of the trunk box. The trunk box is prevented from being unintentionally raised by the load imposed therein. It will be obvious from the above that the trunk box effectively enlarges the capacity of the baggage compartment. Any load that cannot be contained in the baggage compartment itself can be partially contained in the trunk box. It will be remembered that the front end of the trunk box is open so that the load can be continuous from the baggage compartment into the trunk box. If a load is being carried that can be contained in the baggage compartment alone, and it is desired not to remove the trunk box, the trunk box can be run into the compartment and remain there and the load can be carried as if the trunk box were not employed. If articles are to be carried which are of a length greater than the combined length of the baggage compartment and the trunk box, the end gate 56 can be lowered. Such articles as lumber are often carried which extend to a greater length than indicated and extend out the rear end of the trunk box, and are anchored down by any convenient means.

The bottom portion 68 of the tongue 62 is adapted to ride on the bottom of the channel member 24 when the rear end of the trunk box is raised. Thus, the trunk box can be slid into and out of the compartment with ease because of the reduced area of engagement between the portion 68 of the tongue and the bottom of the channel member.

While I have herein shown and described a preferred form of my invention, manifestly it is susceptible of modification and rearrangement of the parts without departing from the spirit and scope thereof. I do not, therefore, wish to be understood as limiting my invention to the precise form herein disclosed, except as I may be so limited by the appended claims.

I claim:

1. For embodiment in the storage compartment of an automobile, said compartment having a floor and an open end, the combination comprising, guide means mounted on the floor of the compartment extending longitudinally thereof and having one end adjacent said open end, a trunk box in the compartment, a tongue on said trunk box engageable with said guide means, said trunk box being slidable out the open end of the compartment throughout the length of said guide means, supporting projections on said trunk box, said supporting projections engaging the floor of said compartment to support said trunk box, and latch means mounted in said compartment, said supporting projections being insertable vertically into said latch means, and said latch means restraining said trunk box against horizontal movement.

2. For embodiment in the storage compartment of an automobile, said compartment having a floor and an open end, the combination comprising, guide means mounted on the floor of the compartment extending longitudinally thereof and having one end adjacent said open end, a trunk box in the compartment, a tongue on said trunk box engageable with said guide means, said trunk box being slidable out the open end of the compartment throughout the length of said guide means, longitudinally spaced supporting projections on said trunk box, said supporting projections engaging the floor of said compartment to support said trunk box, and latch means mounted in said compartment, said supporting projections being insertable vertically into said latch means, said supporting projections being selectively insertable into said latch means in accordance with the positioning of said trunk box in its sliding movement, said latch means restraining said trunk box against horizontal movement.

3. For embodiment in the storage compartment of an automobile, said compartment having a floor and an open end, the combination comprising, guide means mounted on the floor of the compartment extending longitudinally thereof and having one end adjacent said open end, a trunk box in the compartment, a tongue on said trunk box engageable with said guide means, said trunk box being slidable out the open end of the compartment throughout the length of said guide means, supporting projections on said trunk box, said supporting projections engaging the floor of said compartment to support said trunk box, and latch means mounted in said compartment, said supporting projections being insertable vertically into said latch means, spring means in said latch means engageable with said supporting projections effective to normally retain said supporting projections in said latch means, and said latch means restraining said trunk box against horizontal movement.

4. For embodiment in a storage compartment of an automobile, said compartment having a floor and an open end, the combination comprising, a channel member secured on the floor of the compartment having one end adjacent said open end, said channel member having top horizontal flanges defining a longitudinal opening in the channel member, a trunk box, a tongue on said trunk box extensible through said opening into said channel member, said tongue having a bottom portion engageable with the bottom of said channel member, said tongue having a lateral projection engageable with the under side of said flanges, the outer end of said channel member being open, said trunk box being slidable through the open end of the compartment, removable stop means secured in one of said flanges adjacent the outer end of the channel member, said stop means being engageable by said lateral projection for normally preventing removal of said trunk box, supporting projections on said trunk box engageable with the floor of the compartment, said supporting projections being longitudinally spaced from the front end of the trunk box rearwardly, and latch means mounted in the compartment adjacent the open end thereof, said supporting projections being selectively insertable into said latch means, said latch means restraining said trunk box against movement horizontally.

5. For embodiment in the storage compartment of an automobile, said compartment having a floor and an open end, the combination comprising guide means mounted on the floor of the compartment extending longitudinally thereof and having one end adjacent said open end, a load receiving member in the compartment, a tongue attached to said load receiving member adjacent the innermost end of said load receiving member and engageable with said guide means, said load receiving member being slidable out the open end of the compartment, said tongue being adapted to engage the floor of said compartment to help support said load receiving member when said load receiving member is positioned inwardly in said compartment, and supporting projections on said load receiving member engaging the floor of said compartment, some of said supporting projections serving as fulcrums for the cantilevered load receiving member when said load receiving member extends outwardly from said compartment, said guide means engaging said tongue when the load receiving member is so cantilevered, whereby a downward force is impressed on said tongue to restrain said cantilevered load receiving member from pivoting about said fulcrum.

6. For embodiment in the storage compartment of an automobile, said compartment having a floor and an open end, the combination comprising guide means having portions thereof spaced from the floor of the compartment, said guide means extending longitudinally in said compartment and having one end adjacent the open end thereof, a load receiving member in the compartment, a tongue attached to said load receiving member adjacent the innermost end of said load receiving member, said load receiving member being slidable out the open end of the compartment, supporting projections on said load receiving member engaging the floor of said compartment, some of said supporting projections serving as fulcrums for the load receiving member when said load receiving member is cantilevered outwardly from said compartment, positioning means on the floor of said compartment adapted to receive some of the supporting projections, said tongue having a first portion adapted to engage the floor to help support said load receiving member when said load receiving member is positioned within said compartment, and a second portion of said tongue adapted to engage said portions of the guide means spaced from the floor, said second portion of the tongue being located inwardly further within said compartment than said first portion of said tongue, whereby the load receiving member may be pivoted upwardly about said first portion of the tongue to provide for vertical insertion of said supporting projections within said positioning means.

7. For embodiment in the storage compartment of an automobile, said compartment having a floor and an open end, the combination comprising guide means having portions thereof spaced from the floor of the compartment, said guide means extending longitudinally in said compartment and having one end adjacent the open end thereof, a load receiving member in the compartment, a tongue attached to said load receiving member adjacent the innermost end of said load receiving member, said load receiving member being slidable out the open end of the compartment, supporting projections on said load receiving member engaging the floor of said compartment, some of said supporting projections serving as fulcrums for the load receiving member when said load receiving member is cantilevered outwardly from said compartment, positioning means on the floor of said compartment adapted to receive some of the supporting projections, a portion of said tongue in engagement with said portions of the guide means spaced from the floor, and a pivot point about which said second portion of the tongue is swung away from engagement with said guide means toward the floor of said compartment when the outer end of said load receiving member is moved upwardly, whereby the outer end of the load receiving member may be moved upwardly to provide for vertical insertion of said supporting projections within said positioning means.

8. For embodiment in the storage compartment of an automobile, said compartment having a floor and an open end, the combination comprising guide means mounted on the floor of the compartment extending longitudinally thereof and having one end adjacent said open end, a load receiving member in the compartment, a tongue attached to said load receiving member engageable with said guide means, said load receiving member being slidable out the open end of the compartment, and supporting projections on said load receiving member engaging the floor of said compartment, some of said supporting projections serving as fulcrums for the cantilevered load receiving member when said load receiving member extends outwardly from said compartment, said guide means engaging said tongue when the load receiving member is so cantilevered, whereby a downward force is impressed on said tongue to restrain said load receiving member from pivoting about said fulcrum.

ROBERT L. BIGSBY.

REFERENCES CITED

The following references are of record in the file of this patent:

UNITED STATES PATENTS

| Number | Name | Date |
|---|---|---|
| 482,957 | Allen | Sept. 20, 1892 |
| 754,698 | Reed | Mar. 15, 1904 |
| 1,629,403 | Marwahn | May 17, 1927 |
| 2,091,071 | Girl | Aug. 24, 1937 |
| 2,391,310 | Heller | Dec. 18, 1945 |
| 2,470,314 | Lim | May 17, 1949 |